United States Patent Office 2,864,674
Patented Dec. 16, 1958

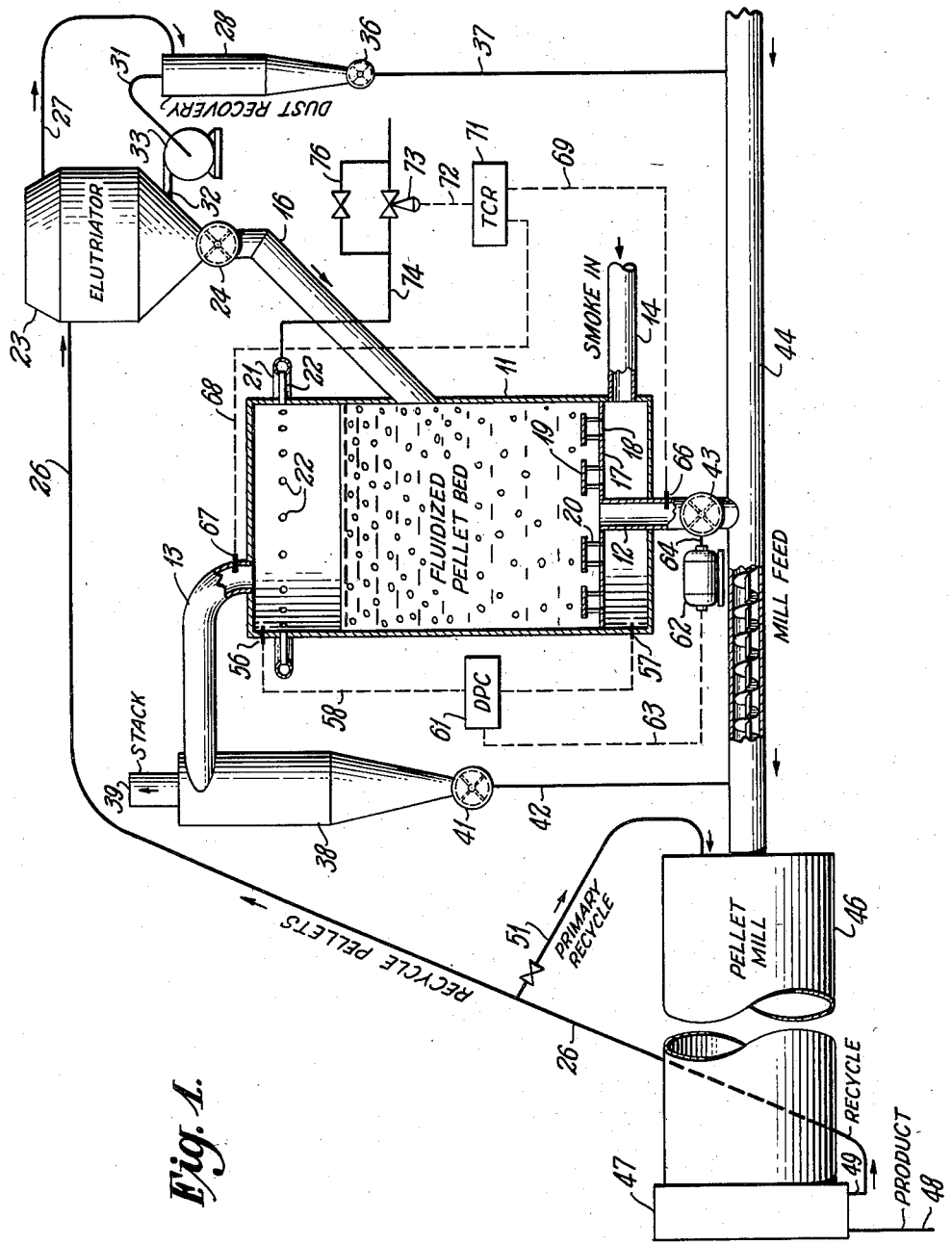

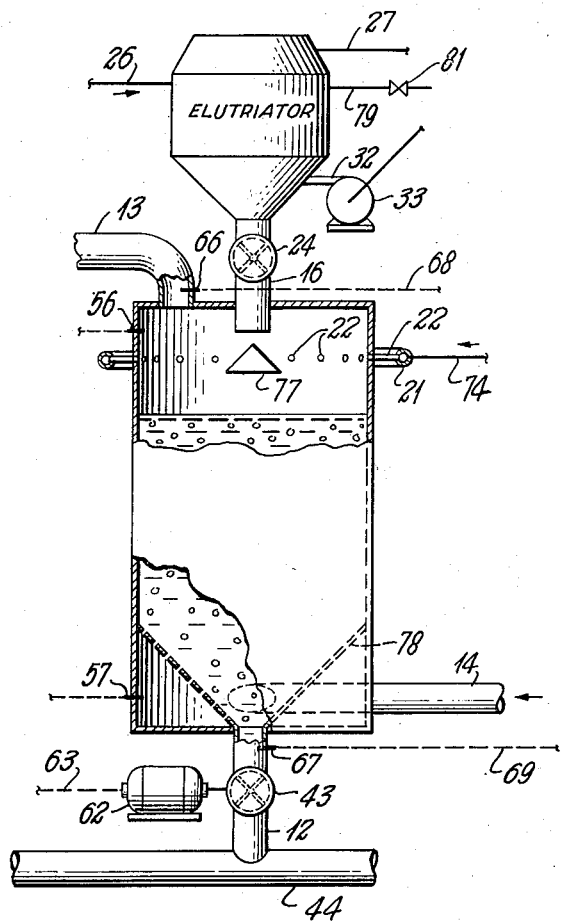

2,864,674

PROCESS AND APPARATUS FOR RECOVERY OF POWDERED MATERIALS SUCH AS CARBON BLACK

William R. King, Bartlesville, Okla., assignor to Phillips Petroleum Company, a corporation of Delaware Application July 12, 1954, Serial No. 442,734

18 Claims. (Cl. 23—314)

This invention relates to a process and apparatus for recovering powdered materials from a gaseous suspension of the same. A specific aspect of the invention pertains to a process and apparatus for recovering carbon black particles from a gaseous suspension thereof and for incorporating the recovered particles in carbon black pellets.

One of the problems in carbon black plant operation is the recovery of loose carbon black from gaseous suspensions thereof, such as the fine particles of black in the smoke from carbon black reactors or furnaces. Since the gas or smoke from carbon black reactors must eventually be vented to the atmosphere, any particles of carbon black which remain in the smoke or gases are lost from the process and plant and create a dust and dirt nuisance around the plant. The recovery of loose black from gaseous suspensions of carbon black has both an economical aspect and a health or sanitary aspect. Various types of equipment have been used in attempting to recover as much as possible of the loose black from gaseous suspensions, including the smoke from the reactor, but the cost of the recovery in equipment reaches a point where it is no longer economical to add equipment to the system in an attempt to effect substantially complete recovery of black particles. The need for a simple carbon black recovery process and apparatus for effecting the same is recognized in the art.

An object of the invention is to provide a process and apparatus for recovery of powdered solids such as carbon black from a gaseous suspension thereof. Another object is to provide a process and apparatus for pelleting carbon black. It is also an object of the invention to provide a process and apparatus for the recovery of carbon black particles from the effluent smoke from a carbon black reactor and incorporating the recovered particles in carbon black pellets. A further object of the invention is to provide apparatus and method for controlling the temperature in a fluidized bed of carbon black. Another object of the invention is to provide an apparatus and method of controlling the bed depth in a fluidized carbon black bed recovery system. Other objects of the invention will become apparent from a consideration of the accompanying disclosure.

In accordance with the invention a fluidized bed of carbon black pellets, replenished by recycled pellets from a conventional pellet mill, is utilized as a means of collecting the carbon black particles from a gaseous suspension thereof. The suspension is introduced to the bottom or lower portion of the fluidized bed and, as it passes upwardly therethru, the particles of black carried in the suspension are deposited on wet or moist pellets in the fluidized bed. A spray of liquid comprising water, oil, and mixtures thereof, is delivered into the top of the fluidized bed so as to moisten and wet the carbon black pellets which are contacted therein with the liquid. The fluidization of the pellets in the bed is effected by means of the gas of the suspension as it is passed sufficiently rapidly upwardly thru the pellet bed in the recovery chamber or vessel. Fresh pellets usually from a pellet mill are introduced to the fluidized bed either from above the level of the bed in the recovery vessel or at a point below the level of the bed and the bed level is maintained relatively constant by withdrawal of pellets from the bottom or lower section of the fluidized bed in proportion to the amount of feed to the bed or in respect to pressure drop of the gas thru the bed as determined from a measurement of pressure in the upper and lower sections of the bed.

Carbon black pellets have an affinity for carbon-black dust or smoke particles and, because of this affinity, the major portion of the dust in a gaseous suspension of carbon black is recovered in a fluidized bed of pellets which are not sprayed with liquid. However, maintaining the fluidized bed in a wet or moist condition effects a substantially complete recovery of dust from the suspension and any particles of carbon black passing out of the recovery chamber are sufficiently large that they are readily recovered in an ordinary cyclone separator, precipitator, or bag filter.

The effluent carbon black pellets from the fluidized-bed recovery vessel carry the loose black particles relatively loosely adhered to their surfaces and it is desirable to more firmly fix the loose black particles to the pellets. Hence the pellets are fed to the feed end of a conventional pellet mill for passage thru the mill as recycle pellets during which time the surface of the pellets is hardened and additional black is accumulated on the pellets in the mill. In this manner a suspension of carbon black particles in a gas can be passed thru the fluidized pellet bed herein described in such manner as to recover the particles of black from the suspension and firmly deposit the recovered black in the pelleted product.

The recovery process described is also applicable to the recovery of particulate solids of other types. An illustration of an application to other materials lies in the pelleting of metal compounds such as metal oxides, clays, etc., alone, or in admixture with binding agents. Fines from the process can be suspended in any suitable gaseous medium and recovered in a fluidized bed of the moist pellets in the manner described for the recovery of carbon black. The invention is also applicable to the recovery of product dust from any commercial process in which the plant product is formed into pellets. The process and apparatus of the invention are also applicable to the recovery of commercial fertilizers in dust form and incorporation of the recovered dust in the product fertilizer pellets.

A more comprehensive understanding of the invention may be had from a consideration of the drawing of which Figure 1 is a schematic view, partly in section, of a preferred arrangement of the apparatus of the invention, and in which Figure 2 is an elevation, partly in section, of a second embodiment of the recovery vessel of the invention. This view is also schematic.

Referring to Figure 1, an upright cylindrical vessel 11 has an outlet conduit 12 for pelleted material and a gaseous effluent conduit 13 for takeoff of the gaseous component of the feed to the process. A feed inlet conduit 14 connects with the lower portion of the shell of chamber 11 and serves to introduce a gaseous suspension of powdered material from any suitable source. A solids inlet conduit 16 opens into chamber 11 thru the side thereof at an oblique angle so as to pass recycle pellets, or pelleted material from any source, into the fluidized bed within the chamber.

In the embodiment of Figure 1 vessel 11 has a false bottom 17 spaced apart from the bottom of the vessel thereby providing a distribution zone for the gaseous suspension introduced as feed. False bottom 17 comprises a plate or header which is preferably uniformly perforate over its surface as represented by holes or openings 18 therein. These holes or perforations provide passageways for the gaseous suspension to pass into the fluidized bed and upwardly therethru. It is desirable to cover the openings with shields or baffle plates 19 which are larger in diameter than the perforations 18 and spaced sufficiently close to plate 17 on two or more legs 20 so as to prevent flow of the fluidized bed thru the perforations. Purely as an illustration, holes 2" in diameter are adequately protected from pellet flow by 5"-diameter plates supported at a distance of 1" from plate 17. Various arrangements of the baffles and openings or perforations are well within the skill of the art.

The spray means for the apparatus comprises a manifold 21 from which tubes or nozzles 22 extend thru the wall of vessel 11. The spray elements inside are desirably directed so as to spray liquid inwardly and downwardly toward the fluidized bed of pellets. Elutriator 23, having a feeder device 24 in the conduit leading from the bottom thereof is connected with pellet inlet conduit 16. The elutriator has a pellet feed line 26 and a gaseous effluent line 27 connected with the top section thereof. Gaseous effluent line 27 leads into the upper section of a dust recovery system including vessel 28. The dust free gaseous material from dust collector 28 may be vented to the atmosphere but is preferably fed back into the elutriator thru lines 31 and 32 by the impetus of blower 33. The dust recovered in collector 28 is passed thru feeder 36 and line 37 to suitable disposal, such as to feed line 44 leading to pellet mill 46.

The apparatus provides a second recovery vessel or separator 38 on the gaseous effluent line 13 from recovery vessel 11. Separator 38 has a stack 39 and a feeder 41 which delivers recovered agglomerated particles thru conduit 42 to suitable disposal, such as to feed line 44 to the pellet mill. A star valve or other type solid feeder 43 positioned in conduit 12 feeds pellets at a regulable rate into a conveyor line 44 which leads to the feed end of pellet mill 46.

Pellet mill 46 represents any suitable conventional pellet mill for transforming loose carbon black into small relatively dense pellets of a generally spherically form. In the type of pellet mill shown, pellets are delivered from a hood 47 into a product line 48 and a recycle line 49. A recycle conveyor 26 connects with recycle line 49 and with elutriator 23. A primary recycle line 51 connects with recycle line 26 and the feed end of the pellet mill. Of course, recycle line 51 may comprise a conveyor connecting directly with recycle line 49.

Pressure-sensitive elements 56 and 57 extend thru the upper and lower sections, respectively, of the shell of chamber 11 and are connected by lines 58 and 59, respectively, to a differential pressure controller 61 so that they are in actuating communication with instrument 61. Differential pressure controller 61 is connected to a motor 62 by line 63 so as to control the speed of motor 62 and therefore the speed of feeder device 43 by means of a linkage 64 therewith.

A pair of temperature sensitive elements 66 and 67 are positioned in effluent conduits 12 and 13, respectively, so as to be sensitive to the temperatures of the effluent pellets and effluent gas, respectively. These elements are connected by lines 68 and 69 to a temperature controller recorder 71 so as to be in actuating communication therewith. This instrument is operatively connected by line 72 to a motor valve 73 in a liquid feed line 74 leading to the water spray system manifold 21. A valved bypass line 76 bypasses motor valve 73. The controls associated with both feeder 43 and valve 73 may be operated by a fluid, such as compressed air, or by electric current, or by a combination of the two.

Referring to Figure 2, this figure shows another embodiment of the recovery vessel 11 in which some of the elements are differently arranged with respect to the vessel. Similar parts or elements of this apparatus are correspondingly numbered to those of Figure 1. Elutriator outlet conduit 16, which is the feed conduit to the vessel, is disposed in the top closure member axially thereof so as to deliver pellets above the bed level in the vessel. A generally conical distributing member or baffle 77 is positioned directly below and spaced apart from the end of the inlet conduit so as to disperse the incoming pellets to the top of the fluidized bed. This figure shows a different arrangement of the false bottom of the vessel in which a generally conical perforated member 78 connects with the upper end of outlet conduit 12 so as to function as a hopper in feeding pellets from the bottom of the fluidized bed into outlet conduit 12. Inlet conduit 14 for carbon black smoke or other gaseous dispersion of solids connects tangentially with the lower section of the shell of vessel 11 below the confluence of funnel-shaped member 78 with the shell. The annular space surrounding funnel 78 serves as a distribution zone for the gaseous dispersion of solids introduced thru feed line 14. Annular baffles (not shown) may be affixed to the upper surface of funnel 78 to assist the distribution of gaseous suspension and to prevent flow of pellets thru the perforations.

A water or other liquid line 79 connects with elutriator 23 for use in spraying all or part of the liquid to the recovery process. Valve 81 in this line may be controlled in a similar maner to that used in controlling flow thru valve 73 of Figure 1. Likewise, line 79 may be connected with a manifold which feeds liquid thru a plurality of branched lines and sprays into the elutriator.

In describing the operation of the plant or process, carbon black will be used as an illustration of the material utilized. Loose black is fed via line 44 by means of a suitable conveyor into pellet mill 46 in conventional manner and small spherical pellets of the black are delivered from the delivery end of the mill as product thru line 48 and as recycle thru line 49. Generally about half of the pellets withdrawn from the delivery end of the mill are recycled to the feed end of the mill although greater and lesser amounts may be recycled. All or any portion of the recycle pellets may be passed thru conveyor line 26 to elutriator 23. In applications where only a portion of the recycle is needed for the fluidized bed in vessel 11 the remaining portion of the recycle pellets is passed thru conveyor 51 into the feed end of the mill.

The recycle pellets introduced thru elutriator 23 are preferably freed of loose black or dust by means of a gas stream such as one passed thru the elutriator by means of blower 33 which forces air or other suitable gas into the bottom of the elutriator thru line 32. The offgas passes thru line 27 and carries the dust in suspension to separator 28. The off-gas from separator 28 may be vented to the atmosphere but it is desirable to return this gate via line 31 to blower 33. The recovered dust is fed by feeder device 36 into line 37 for delivery to feed conveyor 44.

It is not absolutely essential to remove the dust from the pellets in elutriator 23, as introduction of the pellets and dust into the fluidized bed in chamber 11 results in the deposition of the dust particles on the pellets during the fluidization and spraying. However, in instances where an appreciable amount of dust is present in the recycle stream, it is desirable to remove this and pass it to the feed conveyor 44. The pellets are introduced to chamber 11 thru line 16 and become a part of the fluidized bed therein as a result of the velocity of gas passing thru the bed.

A suspension of carbon black from any suitable source such as the smoke from a carbon black reactor is introduced via line 14 into the bottom of chamber 11 below false bottom 17. The gas, carrying carbon particles in suspension, passes upwardly thru openings 18 into the bed of pellets above and the rate of flow of gas is regulated so as to maintain the bed of pellets in the desired turbulent state to form a dense fluidized bed. Water, oil, emulsions thereof, or other suitable liquid is sprayed on to the top of the fluidized bed by means of sprays 22 which are fed from manifold 21 and line 74. The amount of spray is regulated so as to produce a suitable moisture content as determined by the outlet pellet temperature in conduit 12 by means of temperature sensitive element 66. Another modification of the control is to determine the gas outlet temperature by means of temperature sensitive element 67 and regulate the amount of of flow thru motor valve 73 so as to maintain a predetermined gas outlet temperature. A further modification of the liquid control is to regulate the flow thru motor valve 73 in accordance with an average of temperatures determined by elements 66 and 67 so as to maintain a predetermined average of these temperatures.

Normally the smoke from a carbon black reactor is introduced to chamber 11 at a temperature of approximately 1000° F., although this may vary somewhat, the necessary pressure being supplied by the reactor. It is desirable to control the flow of liquid into the system so that the temperature of the pellets in the bottom of the bed is in the range of about 250–450° F. A temperature gradient will exist thru the bed with a top temperature in the range of 150–350° F. The most desirable method of controlling the liquid input is to regulate motor valve 73 so as to maintain a predetermined outlet gas temperature in the vicinity of element 67 which alternatively may be positioned within the upper section of vessel 11.

The fine particles of black introduced to the fluidized bed with the fluidizing gas are deposited on the pellets by impact and affinity of black for black and by the wetting action of the liquid which increases the adherence of black to the pellets. The pellets in the bottom of the bed having the loose black affixed thereto are withdrawn thru conduit 12 under the control of feeder 43. It is desirable to operate feeder device 43 at a constant draw-off rate and regulate the rate by a conventional pressure controller 61 sensitive to the pressures at spaced fixed points in the interior of chamber 11 preferably above and below the fluidized bed as shown at 56 and 57. Pressure drop thru the bed is proportional to the depth of the bed and can be used as a means of regulating the flow of pellets out of the chamber by controlling the speed of motor 62.

Effluent gas from the fluidized bed passes via conduit 13 thru a separator 38 and thence to stack 39 from which it is vented. Little or no dust is entrained in the effluent gas from chamber 11 because of the maintainence of the fluidized bed in wet or moist condition. Any agglomerates which pass thru conduit 13 are recovered in separator 38 and are passed by means of feeder 41 and line 42 into feed conveyor 44. When operating without the liquid spray, some dust is recovered in separator 38.

The water spray functions to prevent the carbon dust from being gradually worked upwardly from the surface of the bed from which it may be lost and to wet down the topmost pellets, but as pellets work deeper into the bed they are dried by the hot incoming gas stream. Thus, the whole bed is kept moist, ranging from quite moist at the top to 1–5 percent water at the discharge. The dry fluidized bed has weaker pellet-forming tendencies than the wet bed. It has been observed that agitated loose black will gradually form soft pellets in the presence of water as is exemplified by the simple agitation of loose black under a water spray as a commercial pelleting process. Even small quantities of water added to dry pellet mills effect a measurable improvement in pellet quality. It is this pelleting action which assures the fixation of the carbon black dust on the wet pellets so that they are firmly enough attached to the pellets to be carried thru the drying zone for delivery to the feed conveyor to the mill. Any elutriation losses occurring in this transfer of the pellets becomes an internal recycle, repeating the process.

The pellet mill completes the pellet formation, additional water being added for cooling, if necessary, and to assist in the pelleting process. The mill discharge is split, as conventional, into product and recycle, the recycle being returned to the fluidized bed. As stated above, the primary recycle shown in the drawing may be omitted.

In another embodiment of the invention spray water or other liquid is introduced into the elutriator via line 79 (Figure 2) to create a wet wall cyclone separator. The rundown from the cyclone passes directly to the fluidized bed to serve the same function as the direct spray. All or part of the water may be introduced to the system in this manner. This modification or embodiment is best operated with the modification of the apparatus shown in Figure 2. The wet pellets are delivered onto conical baffle 77 from which they are dispersed to the top level of the fluidized bed.

In some instances it is desirable to add a small proportion of oil to carbon black pellets. This may be done by spraying the desired amount of oil into the fluidized bed or into the elutriator along with a suitable amount of water for cooling purposes. Other additives such as wetting agents may be incorporated into the liquid sprayed into the system.

Certain modifications of the invention will become apparent to those skilled in the art and the illustrative details disclosed are not to be construed as imposing unnecessary limitations on the invention.

I claim:

1. Apparatus for removing fine particles from a gaseous stream comprising an upright closed vessel having a perforate false bottom in its lower section adapted to pass gas upwardly therethru and prevent the gravitation of solids therethru, an outlet conduit for solids extending thru said false bottom and the bottom of said vessel, its upper end terminating substantially at the level of said false bottom, and an outlet for gases in its upper section, said vessel being unobstructed to flow of solids and gases above said false bottom; an inlet for a gaseous suspension of solids in the bottom section of said vessel below said false bottom; a solids inlet in an upper section of said vessel substantially above said false bottom, said solids inlet being independent of said outlet for gases; and means for controlling the flow of solids from said vessel thru said outlet conduit for solids.

2. The apparatus of claim 1 including spray means in the top section of said vessel for spraying liquid onto the particles in the upper portion of said vessel.

3. The apparatus of claim 1 including a temperature sensitive element in one of the outlets from said vessel; spray means in the top section of said vessel having a feed line connected therewith; a flow control valve in said feed line; a temperature controller sensitive to the temperature of said element and operatively connected to said flow controller so as to provide for control of the flow rate of liquid thru said feed line in response to temperature in said outlet.

4. The apparatus of claim 1 in combination with a pellet mill having a recycle line connected with said solids inlet and a feed line connected with said outlet conduit for solids.

5. The apparatus of claim 1 in which said solids inlet is disposed so as to deliver solids directly to a level below the top of said fluidized bed.

6. Apparatus comprising in combination a carbon black pelleting mill having a feed line to one end section and a product line and a recycle line from the opposite end section; an upright closed vessel having an outlet for gases in the top section and an outlet conduit for pellets in the bottom section, said outlet being connected to the feed line to said mill; a flow control device in said outlet conduit and means for regulating said flow control device so as to maintain a predetermined level of solids in a fluidized bed in said vessel; an inlet conduit connected with the bottom section of said vessel for introducing a carbon black-containing gas thereto; a pellet receiver connected by a conveyor with the pellet recycle line from said mill; a conduit having feed control means therein connecting said receiver with said vessel for delivery of pellets thereto; spray means in the upper section of said vessel for spraying a liquid onto said fluidized bed; and a feed line connected to said spray means having a flow control means therein.

7. The apparatus of claim 6 including means for removing carbon black dust from the pellets in said receiver comprising a blower connected with the lower section of said receiver by a gas line, a gas line connecting the upper section of said receiver with a dust recovery vessel, and a line for solids connecting the bottom of said dust recovery vessel with said feed line.

8. The apparatus of claim 6 including a dust recovery vessel connected by a conduit with said outlet for gases; a conduit connecting a solids outlet in the bottom of said dust recovery vessel with the feed line to said mill.

9. The apparatus of claim 6 including a direct recycle line from aforesaid recycle line to the feed end of said mill.

10. Apparatus for removing fine particles from a gaseous stream comprising an upright closed vessel having an outlet for solids in its bottom and an outlet for gases in its upper section; an inlet for a gaseous suspension of solids in the bottom section of said vessel; a solids inlet in an upper section of said vessel; a conduit connected with said outlet for solids having a flow control device therein; a pair of pressure-sensitive elements positioned in the upper and lower portions, respectively, of said vessel; a differential pressure controller connected to aforesaid elements; and a motor operatively connected to said flow control device, said controller being operatively connected to said motor so as to provide for regulation of flow of solids in response to differential pressure between the locations of said elements.

11. Apparatus comprising in combination a carbon black pelleting mill having a feed line to one end section and a product line and a recycle line from the opposite end section; an upright closed vessel having an outlet for gases in the top section and an outlet conduit for pellets in the bottom section, said outlet being connected to the feed line to said mill; a flow control device in said outlet conduit and means for regulating said flow control device so as to maintain a predetermined level of solids in a fluidized bed in said vessel; an inlet conduit connected with the bottom section of said vessel for introducing a carbon black-containing gas thereto; a pellet receiver connected by a conveyor with the pellet recycle line from said mill; and a conduit having feed control means therein connecting said receiver with said vessel for delivery of pellets thereto.

12. A process for pelleting carbon black comprising passing powdered black to a pelleting mill and pelleting same; recovering a portion of the effluent pellets as product and recycling another portion to the feed end of said mill; passing at least a portion of the recycled pellets, prior to introduction to said mill, into an upper section of a carbon black recovery zone and maintaining a fluidized bed of said pellets therein; spraying a liquid comprising water into the upper section of said bed so as to wet said pellets; passing a gaseous suspension of powdered carbon black upwardly into the bottom of said bed over its entire cross section and upwardly therethru so as to maintain said bed in fluidized condition and deposit powdered carbon black on the moist surfaces of said pellets; withdrawing a stream of the suspending gas from the upper section of said recovery zone; withdrawing pellets from the bottom of said recovery zone and passing same to said mill as recycle; separately recovering dust from the recycled pellets fed to said recovery zone; and introducing the recovered dust to the feed end of said mill.

13. A process for pelleting carbon black comprising passing powdered black to a pelleting mill and pelleting same; recovering a portion of the effluent pellets as product and recycling another portion to the feed end of said mill; passing at least a portion of the recycled pellets, prior to introduction to said mill, into an upper section of a carbon black recovery zone and maintaining a fluidized bed of said pellets therein; spraying a liquid comprising water into the upper section of said bed so as to wet said pellets; passing a gaseous suspension of powdered carbon black upwardly into the bottom of said bed over its entire cross section and upwardly therethru so as to maintain said bed in fluidized condition and deposit powdered carbon black on the moist surfaces of said pellets; withdrawing a stream of the suspending gas from the upper section of said recovery zone; and withdrawing pellets from the bottom of said recovery zone and passing same to said mill as recycle.

14. The process of claim 13 wherein said gaseous suspension of carbon black comprises the effluent smoke from a carbon black reactor.

15. The process of claim 14 wherein said gaseous suspension is at an elevated temperature of at least 600° F. and including the steps of regulating the flow of said liquid in response to a temperature characteristic of said bed so as to maintain a predetermined temperature in the effluent pellet stream from said bed.

16. The process of claim 13 including the steps of maintaining a bed level below the top of said zone by continuously introducing pellets to and withdrawing pellets from said recovery zone and correlating the rates of introduction and withdrawal so as to maintain a predetermined bed level.

17. The process of claim 16 wherein said pellets are introduced to said zone below the bed level.

18. The process of claim 16 wherein said pellets are introduced to said zone above the bed level.

References Cited in the file of this patent

UNITED STATES PATENTS

| | | |
|---|---|---|
| 2,241,674 | Mohr et al. | May 13, 1941 |
| 2,293,113 | Carney | Aug. 18, 1942 |
| 2,431,455 | Blanding | Nov. 25, 1947 |
| 2,457,962 | Whaley | Jan. 4, 1949 |
| 2,477,454 | Heath | July 26, 1949 |
| 2,511,088 | Whaley | June 13, 1950 |
| 2,714,126 | Keith | July 26, 1955 |
| 2,715,565 | McKay | Aug. 16, 1955 |

FOREIGN PATENTS

| | | |
|---|---|---|
| 543,747 | France | Sept. 8, 1922 |
| 498,587 | Belgium | Apr. 9, 1951 |